(12) United States Patent
Wallace et al.

(10) Patent No.: US 11,102,174 B2
(45) Date of Patent: Aug. 24, 2021

(54) AUTONOMOUS ALERTING BASED ON DEFINED CATEGORIZATIONS FOR NETWORK SPACE AND NETWORK BOUNDARY CHANGES

(71) Applicant: Palo Alto Networks, Inc., Santa Clara, CA (US)

(72) Inventors: Lisa Catherine Wallace, San Francisco, CA (US); Matthew Kraning, San Francisco, CA (US); Gregory Toto, San Francisco, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 310 days.

(21) Appl. No.: 16/230,589

(22) Filed: Dec. 21, 2018

(65) Prior Publication Data
US 2019/0199688 A1    Jun. 27, 2019

Related U.S. Application Data

(60) Provisional application No. 62/610,346, filed on Dec. 26, 2017.

(51) Int. Cl.
*H04L 29/06* (2006.01)
*H04L 12/24* (2006.01)

(52) U.S. Cl.
CPC ...... *H04L 63/0236* (2013.01); *H04L 41/0681* (2013.01); *H04L 41/0816* (2013.01); *H04L 41/142* (2013.01); *H04L 63/0272* (2013.01); *H04L 63/1425* (2013.01); *H04L 63/1441* (2013.01); *H04L 41/065* (2013.01); *H04L 41/0886* (2013.01)

(58) Field of Classification Search
CPC .................................................. H04L 63/0236
USPC ........................................................... 726/22
See application file for complete search history.

(56) References Cited

U.S. PATENT DOCUMENTS

| 5,623,601 A | 4/1997 | Vu |
| 6,321,338 B1 | 11/2001 | Porras et al. |
| 7,257,837 B2 | 8/2007 | Xu et al. |

(Continued)

OTHER PUBLICATIONS

Merriam-Webster, "behavior", 2021 (Year: 2021).*

*Primary Examiner* — Ondrej C Vostal
(74) *Attorney, Agent, or Firm* — Gilliam IP PLLC

(57) ABSTRACT

Introduced here are Internet monitoring platforms configured to define, monitor, and assess the boundary of a private network associated with a client. By monitoring the entire Internet, a private network, and relationships between these networks, an Internet monitoring platform can discover changes in the boundary of the private network that is defined by those assets on the private network capable of interfacing with a public network, such as the Internet. The Internet monitoring platform may, in response to discovering the boundary of the private network has experienced a change, identify an appropriate remediation action by mapping the change to a technological issue, a relevant business relationship, etc. For example. If the Internet monitoring platform discovers that the boundary of the private network has expanded due to the introduction of a new cloud computing asset, the Internet monitoring platform may automatically reconfigure a network tool so that traffic generated by the new computing device is examined.

17 Claims, 13 Drawing Sheets

(56) References Cited

U.S. PATENT DOCUMENTS

| | | | |
|---|---|---|---|
| 8,095,581 B2* | 1/2012 | Stobbs | G06Q 50/184 707/934 |
| 8,145,788 B1* | 3/2012 | Love | H04L 61/2557 709/241 |
| 8,576,854 B2 | 11/2013 | Daloz et al. | |
| 9,191,468 B2* | 11/2015 | Suarez Fuentes | H04L 69/22 |
| 9,197,595 B1* | 11/2015 | Sandler | H04L 67/18 |
| 9,628,294 B1* | 4/2017 | Brandwine | H04L 69/167 |
| 2002/0049850 A1* | 4/2002 | Fiori | H04L 29/06 709/227 |
| 2002/0191602 A1* | 12/2002 | Woodring | H04L 41/12 370/389 |
| 2002/0191649 A1* | 12/2002 | Woodring | H04L 43/12 370/381 |
| 2005/0220053 A1* | 10/2005 | Fagan | H04W 40/246 370/331 |
| 2006/0193319 A1* | 8/2006 | Sung | H04L 65/1069 370/389 |
| 2007/0130286 A1* | 6/2007 | Hopmann | H04W 12/04031 709/217 |
| 2011/0134907 A1* | 6/2011 | Parolkar | H04L 65/1069 370/352 |
| 2011/0208862 A1* | 8/2011 | Maffione | H04L 67/02 709/224 |
| 2014/0095724 A1 | 4/2014 | Yoakum et al. | |
| 2018/0091540 A1* | 3/2018 | Solow | H04L 63/0227 |
| 2018/0278647 A1* | 9/2018 | Gabaev | H04L 63/1466 |
| 2020/0296026 A1* | 9/2020 | Michael | H04L 43/08 |

* cited by examiner

| | IP Addresses | Devices | Certificates | Domains | Registration Information (IP Addresses) | Registration Information (Domains) |
|---|---|---|---|---|---|---|
| Core Network<br>• Internal Network<br>• Subnet<br>• DMZ<br>• Vendor<br>• Vendor of Vendor | Effect a network control action to monitor IP or contact POC to monitor IP | Effect a network control action to update device or contact POC to update device | Effect a network control action to update certificate or contact POC to update certificate | Effect a network control action to update domain or contact POC to monitor domain | Contact regional Internet registry (RIR) or contact POC responsible for IP addresses (who will contact RiR) | Effect a network control action to update domain registry information or contact POC to update domain registry information |
| Subsidiary Network<br>• Subsidiary Subnet, Internal Network, DMZ<br>• Subsidiary Shared Hosting<br>• Subsidiary Vendor<br>• Vendor of Subsidiary Vendor<br>• M&A of Subsidiary<br>• Subsidiaries/ Affiliates of Subsidiary | Effect a network control action to monitor IP or contact POC to monitor IP | Effect a network control action to update device or contact POC to update device | Effect a network control action to update certificate or contact POC to update certificate | Effect a network control action to update domain or contact POC to monitor domain | Contact regional Internet registry (RIR) or contact POC responsible for IP addresses (who will contact RiR) | Effect a network control action to update domain registry information or contact POC to update domain registry information |

Technological Categories (column group header); Business Relationship Categories (row group header)

FIGURE 5

Technological Categories

| | IP Addresses | Devices | Certificates | Domains | Registration Information (IP Addresses) | Registration Information (Domains) |
|---|---|---|---|---|---|---|
| Affiliate Network<br>• Affiliate Subnet, Internal Network, DMZ<br>• Affiliate Shared Hosting<br>• Affiliate Vendor<br>• Vendor of Affiliate Vendor<br>• M&A of Affiliate<br>• Subsidiaries or Affiliates of Affiliate | Contact POC to monitor IP | Contact POC to update device | Contact POC to update certificate | Contact POC to monitor/update domain | Contact POC responsible for IP addresses (who will contact RIR) | Contact POC to update domain registry information |
| Deprecated | Contact POC to monitor IP | Contact POC to update device | Effect a network control action to update certificate or contact POC to update certificate | Contact POC to monitor/update domain | Contact regional Internet registry (RIR) or contact POC responsible for IP addresses (who will contact RIR) | Effect a network control action to update domain registry information or contact POC to update domain registry information |

FIGURE 5, CONT.

Technological Categories

| Business Relationship Categories | IP Addresses | Devices | Certificates | Domains | Registration Information (IP Addresses) | Registration Information (Domains) |
|---|---|---|---|---|---|---|
| Mergers & Acquisitions<br>• M&A Target in Diligence Stage<br>• M&A Target in Integration Stage<br>• Newly Merged Company<br>• Newly Acquired Company | Effect a network control action to monitor IP or contact POC to monitor IP | Effect a network control action to update device or contact POC to update device | Effect a network control action to update certificate or contact POC to update certificate | Effect a network control action to update domain or contact POC to monitor/update domain | Contact regional Internet registry (RIR) or contact POC responsible for IP addresses (who will contact RIR) | Effect a network control action to update domain registry information or contact POC to update domain registry information |
| Public Internet<br>• Public Wi-Fi Networks<br>• Guest Networks | Contact POC to monitor IP | Contact POC to update device | Contact POC to update certificate | Contact POC to monitor/update domain | Contact POC responsible for IP addresses (who will contact RIR) | Contact POC to update domain registry information |

FIGURE 5, CONT.

| | Technological Categories | | | | | |
|---|---|---|---|---|---|---|
| | IP Addresses | Devices | Certificates | Domains | Registration Information (IP Addresses) | Registration Information (Domains) |
| Divested Assets<br>• Divested from Core Network<br>• Divested from Subsidiary<br>• Divested from Affiliate<br>• Divested from Vendor | Contact POC to monitor IP | Contact POC to update device | Contact POC to update certificate | Contact POC to monitor/update domain | Contact POC responsible for IP addresses (who will contact RIR) | Effect a network control action to update domain registry information or contact POC to update domain registry information |
| Multi-Tenant and Ephemeral Environments | Contact POC to monitor IP | Contact POC to update device | Contact POC to update certificate | Contact POC to monitor/update domain | Contact POC responsible for IP addresses (who will contact RIR) | Contact provider to update domain registry information |

Business Relationship Categories

FIGURE 5, CONT.

|  | Technological Categories | | | | | |
|---|---|---|---|---|---|---|
|  | IP Addresses | Devices | Certificates | Domains | Registration Information (IP Addresses) | Registration Information (Domains) |
| Development Environments | Contact POC to monitor IP | Effect a network control action to update device or contact POC to update device | Effect a network control action to update certificates or contact POC to update certificate | Effect a network control action to update domain or contact POC to monitor/update domain | Contact regional Internet registry (RIR) or contact POC responsible for IP addresses (who will contact RIR) | Effect a network control action to update domain registry information or contact POC to update domain registry information |
| Client-Defined Groups of Assets or Network Boundary | Effect a network control action to monitor IP or contact POC to monitor IP | Effect a network control action to update device or contact POC to update device | Effect a network control action to update certificate or contact POC to update certificate | Effect a network control action to update domain or contact POC to monitor/update domain | Contact regional Internet registry (RIR) or contact POC responsible for IP addresses (who will contact RIR) | Effect a network control action to update domain registry information or contact POC to update domain registry information |

Business Relationship Categories

FIGURE 5, CONT.

| | Technological Categories | | | | | |
|---|---|---|---|---|---|---|
| | IP Addresses | Devices | Certificates | Domains | Registration Information (IP Addresses) | Registration Information (Domains) |
| Vendors | Contact vendor to monitor IP | Contact vendor to update device | Contact vendor to update certificate | Contact vendor to monitor/update domain | Contact vendor responsible for IP addresses (who will contact RIR) | Contact vendor to update domain registry information |
| Client of Client<br>• Client of Client's Subsidiary, Network Boundary, Subnet, etc. | Contact client to monitor IP | Contact client to update device | Contact client to update certificate | Contact client to monitor/update domain | Contact vendor responsible for IP addresses (who will contact RIR) | Contact client to update domain registry information |

Business Relationship Categories

801
Scan for open ports on the edge(s) of a network associated with a client

802
Collect responses from those ports, including any partial responses

803
Establish a statistical baseline based on the responses

804
For each new scan, determine whether the response(s) deviate from the statistical baseline

805
Generate an alert responsive to discovering a deviation from the statistical baseline

FIGURE 8

AUTONOMOUS ALERTING BASED ON DEFINED CATEGORIZATIONS FOR NETWORK SPACE AND NETWORK BOUNDARY CHANGES

CROSS-REFERENCE TO RELATED APPLICATIONS

This application claims priority to U.S. Provisional Application No. 62/610,346, titled "Autonomous Alerting System for Network Monitoring Based on Technically-Defined Categorizations for Network Space and Network Boundary Change" and filed on Dec. 26, 2017, which is incorporated by reference herein in its entirety.

TECHNICAL FIELD

Various embodiments concern technologies related to network security. More particularly, various embodiments concern an autonomous system capable of monitoring a network based on technically-defined categorizations for network space and network boundary changes, and then generating an alert responsive to determining that a certain condition has been met.

BACKGROUND

A computer network (also referred to as a "data network" or "network") is a digital telecommunications network that allows nodes to share resources. In a network, computing devices exchange data with one another via connections (also referred to as "data links"). These data links may be established over cable media, such as copper wires or fiber optic cables, or wireless media, such as Wi-Fi or Bluetooth® communication channels.

Modern networks include a variety of complex technologies that that govern how multiple technological systems are connected to one another, and thus work together. This is very different from the beginning of the Internet when computer networks were much simpler. In those days, companies generally housed their connected digital assets (or simply "assets") on statically allocated ranges of Internet Protocol (IP) addresses. Several different factors contributed to make historical networks somewhat static in nature. For example, in the past, computing devices were not portable and, therefore, did not transfer between different networks. Moreover, sensitive computing devices (e.g., payment systems and storage systems) were typically housed onsite on company-owned infrastructure, merger and acquisition activity was slower and less frequent, and vendor relationships were less complicated.

Today, the picture is very different for organizations. Whereas previously organizations' networks could be defined by a relatively small number of devices in generally fixed, known locations, processing specific data, today their networks have expanded dramatically in terms of the number of devices, number of device types, and relationships between those devices and the business itself. Computing devices can be readily taken outside of private networks (e.g., enterprise networks) and connected to public networks (e.g., the Internet). Sensitive data is often stored in network-accessible environments (also referred to as "cloud environments") rather than on company-owned infrastructure. This is particularly true for web hosting. These cloud environments can be designed for a single tenant or multiple tenants, which can make it difficult for a company to know where their assets reside and how to protect their assets at any given time. Companies themselves have also changed. Services are more frequently farmed out to vendors (thereby resulting in more complex supply chains), merger and acquisition activity has dramatically increased, offices are distributed across a broader geographic area, and there are a greater number of complex subsidiary, affiliate, and subnet relationships than in the past.

All of these changes affect how a company can legally secure its local network (also referred to as an "internal network"), and even know the full extent of its internal network. While certain people and organizations within an organization may in principle have knowledge of individual segments of the organization's internal network, centrally aggregating that knowledge to provide a complete, current, and accurate view of the entire internal network of the organization is a daunting systems and data integration challenge that few large organizations have successfully undertaken. This is made ever more difficult by decentralized decision making that may lead to new segments being added to the internal network without proper notification of central information technology (IT) authorities nor registration in authoritative central IT tracking systems used by the organization. Systems on these newly created segments are on the one hand assets of the organizations, and on the other hand are unknown to the central IT staffs of the organization. Thus, any changes to these new segments, including changes which introduce substantial risk and/or do not comply with existing IT and IT security policies, will go unnoticed by central IT staffs using standard tools and capabilities, which puts the organization at substantial risk.

SUMMARY

Introduced here are Internet monitoring platforms configured to define, monitor, and assess the boundary of a private network associated with a client. By monitoring the public Internet, a private network (also referred to as a "local network" or an "internal network"), and the relationships between these two networks, an Internet monitoring platform can discover changes in the boundary of a private network that is defined by those assets capable of interfacing with a public network, such as the Internet. The Internet monitoring platform may, in response to discovering the boundary of a private network has experienced a change, identify an appropriate remediation action by mapping the change to a technological issue, a relevant business relationship, etc. For example, if the Internet monitoring platform discovers that the boundary of the private network has expanded due to the introduction of a new cloud computing asset, the Internet monitoring platform may automatically reconfigure a network tool so that traffic generated by the new computing device is examined.

When examining the newly-changed boundary of the private network, the Internet monitoring platform can watch for various scenarios that correspond with an increased likelihood that a security threat exists. For example, if a new device capable of connecting to the Internet is discovered to have been added to the private network, the Internet monitoring platform can take appropriate remediation action(s) to address the increased risk posed by the new device. In such embodiments, the Internet monitoring platform may reconfigure any network tools deployed on the private network to ensure that traffic originating from, or directed to, the new device is examined by these network tool(s). As another example, if a communication policy governing how an existing device can communicate over the Internet is modified, the Internet monitoring platform can monitor traffic originating from, or directed to, the existing device to ensure it conforms with the modified communication policy.

Critically, the Internet monitoring platforms described herein are able to autonomously discover and alert to changes that are frequent in modern private networks, but which existing technologies and solutions are unable to detect. For example, if an employee of an organization takes a purchasing card and creates their own cloud account—distinct from an existing organization account with a cloud provider—then any network monitoring tools which only examine known cloud accounts for the organization will be blind to any changes this employee makes in the new cloud account they created. Using an Internet monitoring platform, the detection of the newly created cloud computing asset can be accomplished by continuously examining the public Internet for changes that can be related back to an organization, and when those changes are detected, automatically updating the platform's database of the corresponding organization's private network as well.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 5 provides an example matrix of technological categorizations and business relationship categorizations.

FIG. 8 includes a flow diagram of a process for discovering the open ports on a computer network.

Figure 1:
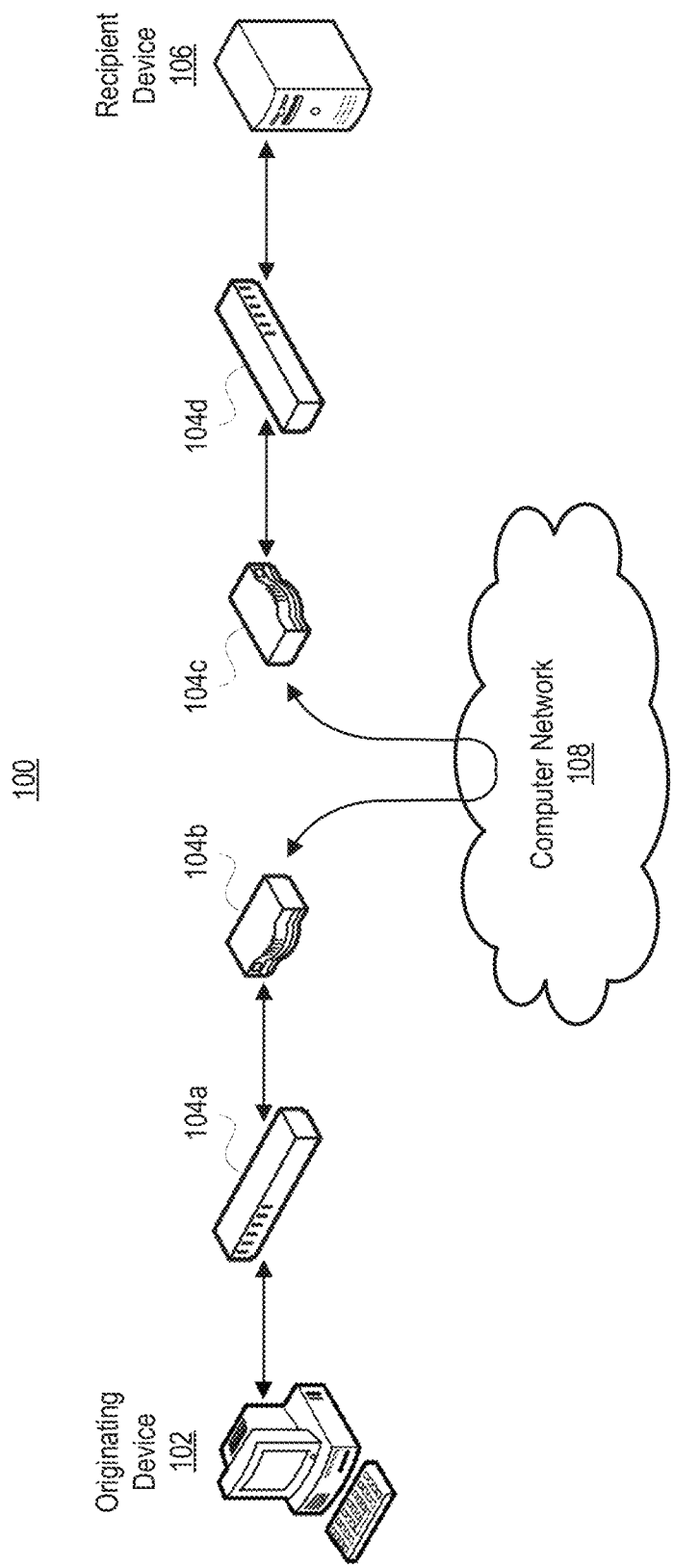
FIG. 1 depicts an example of a network arrangement in which multiple computing devices (also referred to as "nodes") communicate via a network.

The drawings depict various embodiments for the purpose of illustration. Those skilled in the art will recognize that alternative embodiments may be employed without departing from the principles of the technology. Accordingly, while specific embodiments are shown in the drawings, the technology is amenable to various modifications.

DETAILED DESCRIPTION

Conventional network tools suffer from several limitations that affect their ability to promptly and properly account for changes to a network. First, the vast majority of conventional network tools require that a list of assets on the network be manually provided as input. Because conventional network tools cannot discover these assets on their own, they cannot autonomously generate asset lists. At present, the overwhelming practice is to periodically feed static asset lists to a network tool, generally in the form of a Microsoft Excel® spreadsheet. However, these asset lists are often wildly inaccurate because networks consistently change over time and the business units involved in security (e.g., vulnerability management, networking, security operations, etc.) tend to maintain separate asset lists that rarely match one another. Consequently, a common operating understanding is rarely available for assets, policies, or processes for discovering changes to a network.

Second, conventional network tools are prone to errors due to latency and inaccurate input. While a static asset list may have sufficed several years ago, networks now change so frequently now that it is no longer tenable to maintain an accurate asset list without remapping on a periodic basis (e.g., monthly, weekly, or daily).

Third, some conventional network tools are too intensive to be legally applied to certain parts of a network. For instance, a network tool may be designed to operate only on network space that a company definitely owns (e.g., those Internet Protocol (IP) addresses registered directly to the company). Operating these tools on assets that a company manages but does not own—such as cloud computing assets—may violate the terms of use for the tool and in certain cases can also violate United States law (and those of other jurisdictions, such as the European Union). Furthermore, some network tools require nuanced configurations to successfully conform to certain business relationships. For example, an isolated subnet may be designed to allow certain types of traffic through that would not normally be allowed on the rest of the network. As another example, a network may include a core network associated with a company and subnet(s) associated with affiliated entities who are not subsidiary entities of the company. An example of an affiliated entity is a vendor.

Special configurations of network tools may be needed to meet the security challenges posed by modern networks. In particular, the proper use of a given tool will depend on the context and type of network it is operating in, in addition to the business relationship the organization which is operating the tool has with the ultimate owner and operator of the network the tool is operating over. Examples of network tools include firewalls, vulnerability scanners, intrusion detection systems (IDSs), intrusion prevention systems (IPSs), penetration tests, endpoint security mechanisms, network performance monitors, and software-defined networking (SDN) orchestration mechanisms. To properly identify security risks to a network, the network tool(s) associated with the network must be configured to observe the right things (e.g., the assets that the company has a legal right to monitor intensively). Those skilled in the art will recognize that network tools may be configured differently when deployed on different parts of a network to meet certain business objectives. For example, traffic originating from a website accessible on the Internet may be permitted to reach a first subnet but not a second subnet.

To account for the subtle-but-consistent changes experienced by modern networks, however, configurations of network tools must be updated to reflect proper operation on the correct and current state of the network they are operating on. Introduced here, therefore, are Internet monitoring platforms configured to define, monitor, and assess the boundary of a private network associated with a client (also referred to as an "organization," "enterprise," or "customer"). By monitoring a private network (also referred to as a "local network" or an "internal network"), the entire public Internet, and the relationship between the two, an Internet monitoring platform can discover changes in the boundary that is defined by those assets capable of interfacing with a public network, such as the Internet. The Internet monitoring platform may, in response to discovering the boundary has experienced a change, identify an appropriate remediation action by mapping the change to a technological issue, a relevant business relationship, etc. For example. If the Internet monitoring platform discovers that the boundary of the private network has expanded due to the introduction of a new cloud computing device, the Internet monitoring platform may automatically reconfigure a network tool so that traffic sent from that device to other parts of the network is not blocked.

Terminology

References in this description to "an embodiment" or "one embodiment" means that the feature, function, structure, or characteristic being described is included in at least one embodiment. Occurrences of such phrases do not necessarily refer to the same embodiment, nor do they necessarily refer to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Definitions for several terms are provided below for reference:

Device: Any piece of equipment, either physical or digital, that is connected to a network (e.g., a private network or a public network, such as the Internet) via a port, regardless of whether the connection is intentional or unintentional.

Domains: Inclusive of all Domain Name Servers (DNS) record types, domains, zone transfer files, WHOIS registration information, and fully qualified domain names (FQDNs), both present and historical.

Registration Information (IP Addresses): Any registration information associated with an IP address or range of IP addresses, including but not limited to regional Internet registry (RIR) records, third-party aggregator records, content delivery network (CDN) records, Internet service provider (ISP) records, and privately aggregated information such as Managed Security Service Provider (MSSP) documentation.

Registration Information (Domains): Any authoritative or unauthoritative registration information associated with any domain, including WHOIS information (both current and historical) as well as other association information for other sources.

Deprecated Assets: Any asset previously associated with a client that upon remapping is found to no longer be associated with the client via a proprietary network mapping process.

Affiliate: An entity for which a client may have a fiduciary responsibility or a business interest but not a full set of legal rights, obligations, or motivations to secure it as a normal subsidiary. Examples of affiliates include joint ventures, vendors, supply chain relationships, etc.

Client of Client: An entity with which a client does business. One example is an entity for which the client provides goods and/or services.

Vendor of Vendor: Any vendor related to the vendor of a client by a business relationship. One example is a related vendor that is at least two degrees removed from the client.

Control Action: Any action undertaken by autonomous machine means or human action that remotely controls a policy, system, configuration, or function of an Internet monitoring platform, orchestration automation platform, network tool, or human process. These actions may be defined by the client or the Internet monitoring platform, which may be responsible for identifying, assessing, and monitoring vulnerability of a private network to security threats.

Business Relationship: Any business relationship defined by a client or an Internet monitoring platform.

Network Boundary: Any collection of IP addresses which are public routable on the Internet—for example, IPv4 addresses which are not reserved under RFC 1918—but which also belong to, are controlled or managed by, or are associated with a private network associated with a client. For example, these could include but are not limited to statically allocated IPs which the organization owns and manages, IPs of cloud computing servers hosting IT systems controlled by the organization, and IPs of gateway devices through which corporate assets send network communications to the public Internet—such as the public Internet IP of a Wi-Fi router that a laptop computer belonging to the organization is connected to. In some embodiments the network boundary is defined by a client, while in other embodiments the network boundary is automatically discovered by an Internet monitoring platform.

Boundary Change: Any change to an asset that affects the network boundary of a private network associated with a client. A boundary change may also be referred to as a "network change."

Description of Selected Embodiments

A network allows computing devices to share resources. FIG. 1 depicts an example of a network arrangement 100 in which multiple computing devices (also referred to as "nodes") communicate via a network 108. The nodes couple an originating device 102 (e.g., a desktop computer) to a recipient device 106 (e.g., a computer server). Thus, the nodes allow data packets to be transmitted between the originating device 102 and the recipient device 106. Examples of nodes include switches (e.g., switches 104a, 104d), routers (e.g., routers 104b, 104c), etc. Each node represents a possible entry point into the network 108. The entry points could be, and often are, from different points within the network 108.

Oftentimes, a communication will traverse multiple networks as it travels from the originating device 102 to the recipient device 106. For example, if the originating device 102 resides within a private network associated with a client, then the communication must leave the private network and then enter another network (e.g., the Internet) to which the recipient device 108 is connected.

The ability to communicate across vast distances via networks has facilitated significant changes in everyday life. For example, computing devices located in different countries can readily communicate with one another to conduct a business transaction. However, the interconnectivity facilitated by networks can also be used maliciously, and the ease of communicating via these networks can make it difficult to identify unauthorized activities performed by bad actors.

One technique for managing the threat posed by malicious actors involves actively monitoring the boundaries of a network. This technique may be referred to as "boundary monitoring" or "perimeter monitoring." Traditional boundary monitoring techniques treat the boundary as largely static, with updates occurring infrequently and usually requiring manual updating of the monitoring system's representation of what and where the network boundary was located. As further described below, upon discovering the boundary of the network has changed in some manner, an Internet monitoring platform can take appropriate action(s) to address the change. For example, the Internet monitoring platform may autonomously reconfigure a network tool to account for the addition of a new public-facing IP address, the removal of an existing public-facing IP address, etc.

Figure 2:
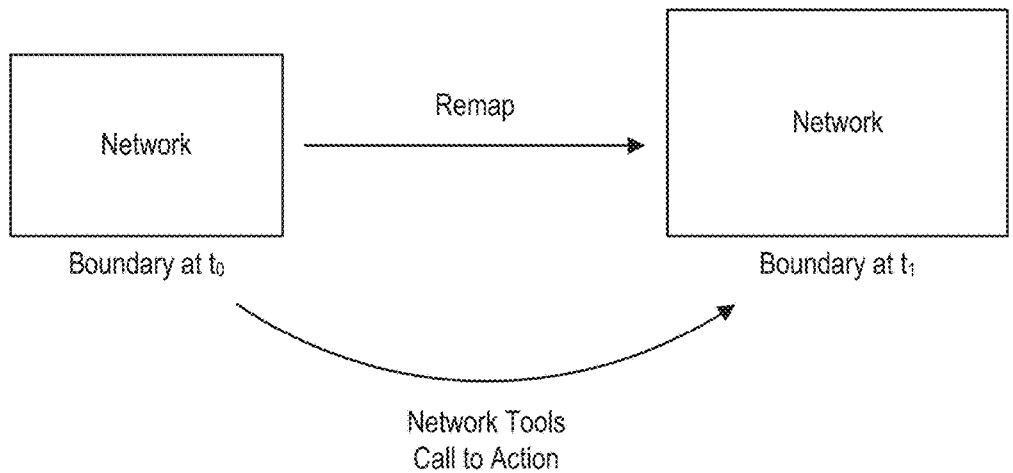
FIG. 2 illustrates how the boundary of a private network associated with a client may change over time.

FIG. 2 illustrates how the boundary of a private network associated with a client may change over time. Here, for example, the boundary has increased in size between a first point in time (i.e., $t_0$) and a second point in time (i.e., $t_1$). An increase in the boundary will often correspond to an increase in the number of outward-facing IP addresses associated with the client, or a change to the services running on that public IP address. For example, if a client is involved in a merger, the private network associated with the client may be redefined as a new private network. In such a scenario, multiple existing private networks (e.g., Network A and Network B belonging to Client A and Client B, respectively) may be dynamically redefined as a new private network (e.g., Network C belonging to Clients A and B). Similarly, if a client establishes a new business relationship with an affiliate, multiple existing private networks (e.g., Network A and Network B belonging to Client A and the affiliate, respectively) may be dynamically redefined as a new private network (e.g., Network C belonging to Client A and the affiliate). Note, however, that the client and affiliate may have limited access to portions of the new private network (e.g., the affiliate may not be permitted to access some information related to the client, technical restrictions may be placed on the tools the client can run to probe the affiliate network, and vice versa).

By monitoring boundary changes, an Internet monitoring platform can identify locations that may be susceptible to unauthorized access, as well as appropriate remediation action(s) for ensuring that a breach does not occur. For example, an Internet monitoring platform may remap a network tool configuration in real time responsive to discovering the bounds of a private network have changed. Thus, a network tool designed to monitor traffic entering, exiting, or traversing the private network may be reconfigured to account for the new boundary. This process may be repeated ad infinitum to address security risks before the private network is impacted.

Figure 3:
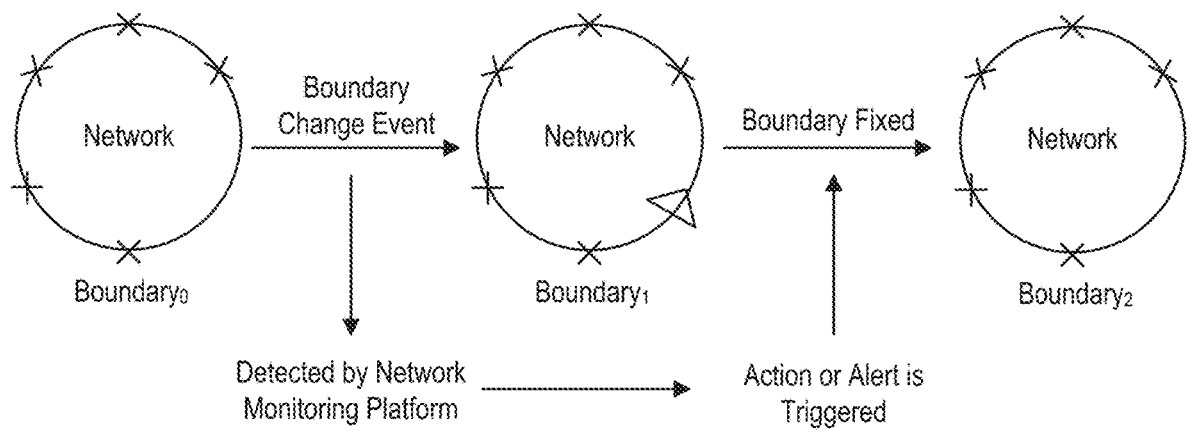
FIG. 3 includes a generalized illustration of a process for discovering changes to the boundary of a network (e.g., a private network associated with a client).

FIG. 3 includes a generalized illustration of a process for discovering changes to the boundary of a network (e.g., a private network associated with a client). Initially, an Internet monitoring platform can identify the network and discover the boundary of the network. For example, the Internet monitoring platform may examine communications originating from within the network to identify the public-facing devices responsible for transmitting the communications. As another example, the Internet monitoring platform may transmit signal(s) to a device that resides within the network and then determine, based on whether response(s) have been returned, if the device forms part of the boundary. Thereafter, the Internet monitoring platform can monitor the boundary of the network. Such action may be performed continually or periodically. For example, in some embodiments, the Internet monitoring platform examines the boundary of the network on a monthly, weekly, daily, or hourly basis.

In some instances, the Internet monitoring platform will discover that a boundary change event has occurred by monitoring the Internet, not just the extant private network, for the presence of new devices on the Internet which appear to be affiliated with a client, but which were not previously part of the network boundary of the client. A boundary change event is any detectable change to the characteristics of an asset or group of assets that comprise the boundary of a network. Example of boundary change events include the instantiation of a new device capable of connecting to the Internet, the removal of an existing device capable of connecting to the Internet, and the modification of a communication policy that governs how an existing device can communicate over the Internet, the creating of a new cloud resource by a client that is publicly accessible on the Internet. As shown in FIG. 3, the boundary change event alters the boundary of the network. Here, for example, the boundary change event has introduced another entry point into the network that is susceptible to unauthorized access.

The Internet monitoring platform can then address the boundary change event. In some embodiments, the Internet monitoring platform performs an appropriate remediation action based on the boundary change event. The appropriate remediation action may include rolling back the boundary change event, initiating some best practice policy or standard operating procedure, involving another platform or tool, etc. In other embodiments, the Internet monitoring platform generates an alert that describes the boundary change event. The particular remediation action depends on the nature of the network change, the existing tools the Internet monitoring platform has access to, and the allowable policies for those tools on different kinds of networks. For example, if the Internet monitoring platform has administrative access to certain firewalls across an organization's network boundary, and the organization has a policy that only traffic from identified corporate devices be allowed through a firewall, then upon detecting a boundary change, say a new organization cloud asset at IP 1.2.3.4 is created, the Internet monitoring platform could automatically configure the firewalls to allow traffic to and from 1.2.3.4. Importantly, this change does not require that the Internet monitoring platform have any privileged access to 1.2.3.4, or even that the cloud environment 1.2.3.4 is part of also be operated by any system controlled by the Internet monitoring platform. In other cases, the Internet monitoring platform may transmit a boundary change alert to a special administrator who is responsible for addressing security risks to the network. For example, the special administrator may be responsible for correctly configuring network tools designed to identify, assess, and address threats to the network. The Internet monitoring platform may determine which of these actions to perform based on the nature of the boundary change event itself. In some instances, the Internet monitoring platform may perform both actions. For example, the Internet monitoring platform may notify the special administrator that which remediation action(s) have been autonomously performed on behalf of the client to address the risk posed by the boundary change event.

Figure 4:
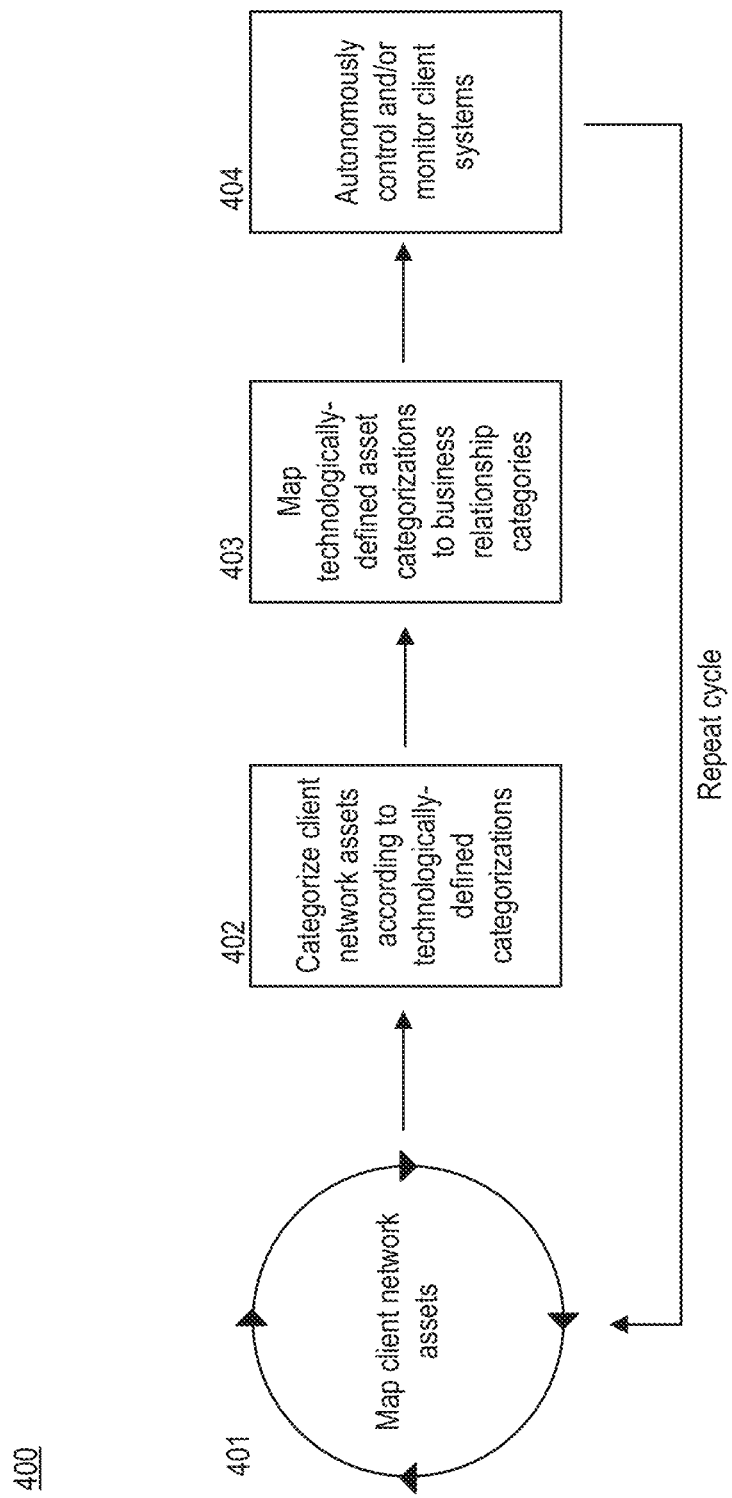
FIG. 4 includes a flow diagram of a process for autonomously addressing the security risks posed by boundary change events.

FIG. 4 includes a flow diagram of a process 400 for autonomously addressing the security risks posed by boundary change events. Initially, an Internet monitoring platform can discover the assets associated with a client and then map the discovered assets to a network to establish a boundary (step 401). Such action can be performed continuously or periodically. To discover the assets associated with a client, the Internet monitoring platform may employ a variety of techniques, including:

Mapping client entities' ranges of IP addresses via analysis of current or historical registration information in RIRs that appear to be registered to the client or a related entity (e.g., a subsidiary or an affiliate).

Mapping client entities' ranges of IP addresses via analysis of Autonomous System Number (ASN) information or net handles that appear to be associated with the client or a related entity (e.g., a subsidiary or an affiliate).

Mapping client entities' domain names via analysis of web service hostnames that appear to be associated with the client through certificates, domain name records, or domain name registration information.

Detection of abrupt but sustained changes in rates of traffic flow between a known set of IP addresses (also referred to as a "core IP space") and other Classless Inter-Domain Routing (CIDR) blocks on the Internet.

Detection of rare user agent strings, which may indicate common software configuration management and/or golden computer images in different CIDR blocks.

Additional information on these techniques can be found in U.S. application Ser. No. 15/984,030 titled "Correlation-Driven Threat Assessment and Remediation," which is incorporated by reference herein in its entirety.

Thereafter, the Internet monitoring platform can categorize the assets according to technologically-defined categorizations (step 402). Said another way, the Internet monitoring platform can categorize the assets based on the technological characteristic(s) of each asset. For example, the Internet monitoring platform may determine whether each asset corresponds to:

A range of IP addresses directly registered to the client's primary business entity or subsidiary business entities, if any.

A range of IP addresses registered to an MSSP on behalf of the client (e.g., "<Customer> C/O IBM").

A range of IP addresses registered to a provider of cloud-based hosting services, such as Akamai or Rackspace, who is responsible for running a service on behalf of the client.

A range of IP addresses owned by a hosting provider into which a DNS record for a domain owned by the client resolves.

The Internet monitoring platform can then map the technologically-defined categorizations to a set of business relationship categories (step 403). These business relationship categories may be defined by the client, the Internet monitoring platform, or any combination thereof. Examples of business relationship categories include parent network, subsidiary network, multi-tenant cloud environment, CDN, vendor, Platform-as-a-Service (PaaS), Infrastructure-as-a-Service (IaaS), etc. Associating each asset with a business relationship category allows the Internet monitoring platform to gain a better understanding of who is responsible for managing each asset, the appropriate permissions) for each asset, the relationship between pairs of assets, etc.

The Internet monitoring platform may also be configured to autonomously react to changes in the network following a boundary change event, including a change to either a technological category or a business relationship category. For example, the Internet monitoring platform may automatically address changes to registration information corresponding to IP addresses mapped to the client, detectable assets connected to the Internet across range(s) of IP addresses mapped to the client, traffic flows or flow volume between CIDR ranges, DNS/WHOIS information corresponding to a domain associated with the client, etc. Similarly, the Internet platform may automatically address modifications caused by an acquisition, merger, or divestiture, the introduction of a newly registered domain, the expiration of a certificate corresponding to a known asset, etc.

In some embodiments, the Internet monitoring platform is configured to autonomously control and/or monitor at least one technological system associated with the client (step 404). For example, the Internet monitoring platform may remotely execute actions against relevant network tools, processes, devices, etc., such that these items are reconfigured to properly account for the modified network space resulting from network boundary changes. The process 400 may be continually or periodically repeated to ensure that network modifications caused by network boundary changes can be addressed before a breach occurs.

FIG. 5 provides an example matrix of technological categorizations and business relationship categorizations. The horizontal axis denotes the technological categorizations that the Internet monitoring platform might associate with a client, such as the IP addresses registered/attributed to the client, devices registered/attributed to the client, certificates directly issued/attributed to the client, etc. The vertical axis denotes the business relationship categorizations that the Internet monitoring platform might associate with a client, such as a core network, a subsidiary network, a cloud environment, vendor-managed assets, etc. Together, these categorizations may govern what action(s) the Internet monitoring platform can take with respect to an asset. For example, if the Internet monitoring platform discovers a boundary change event involves an IP address associated with the core network, then the Internet monitoring platform may affect a network control action to monitor the IP address or contact a point of contact (POC), such as a special administrator, who can monitor the IP address. Conversely, if the Internet monitoring platform discovers the boundary change event involves an IP address associated with an affiliate network, then the Internet monitoring platform may be limited to contacting the POC who can monitor the IP address.

In FIG. 5, the column that pertains to registration information for IP addresses may involve either contacting the RIR directly or contacting the POC who is responsible for managing the IP addresses (and they, in turn, may contact the RIR). Similarly, the column that pertains to registration information for domains may involve either contacting the domain registry directly or contacting the POC who is responsible for managing domains (and they, in turn, may contact the domain registry). If a domain is managed/owned by an entity other than the client, then the Internet monitoring platform can contact the other entity. The term "contact," as used herein, includes calling, emailing, filing a ticket (e.g., a customer support ticket), sending an instant message, generating a notification, identifying influence via workflow or communications, etc.

Figure 6:
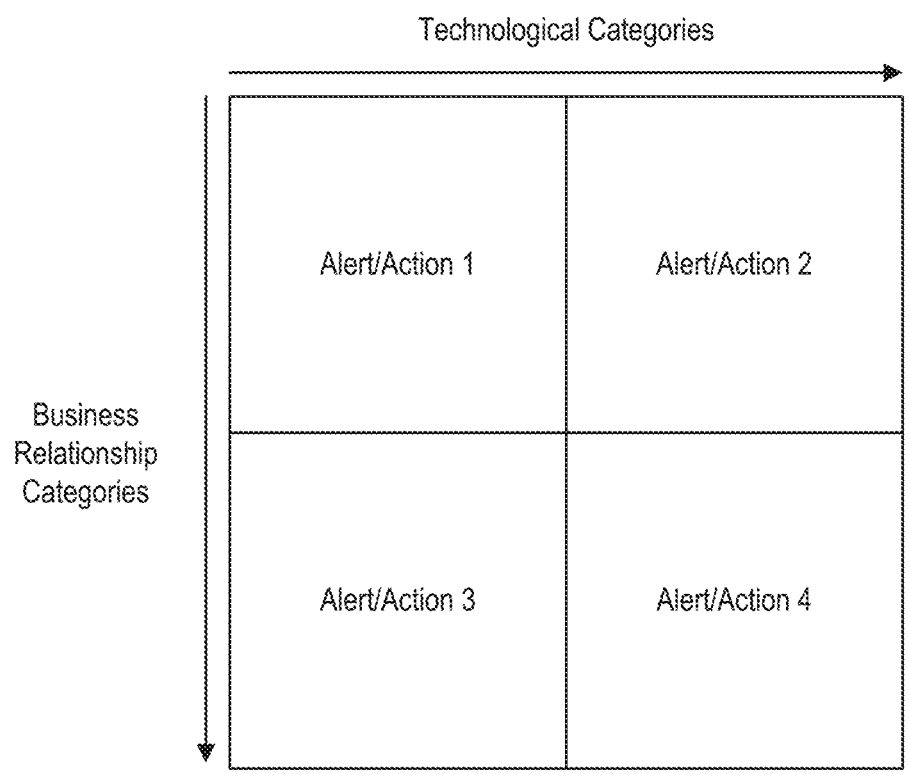
FIG. 6 includes a conceptual matrix corresponding to the example matrix shown in FIG. 5.

FIG. 6 includes a conceptual matrix corresponding to the example matrix shown in FIG. 5. As shown in FIG. 6, an Internet monitoring platform may take different actions based on which technological category and business relationship category an asset is associated with. While the conceptual matrix shown here includes a different action in each quadrant, that need not necessarily be the case. For instance, different combinations of categories (e.g., Technological Category A and Business Category A, Technological Category B and Business Category A) may be associated with the same action.

Figure 7:
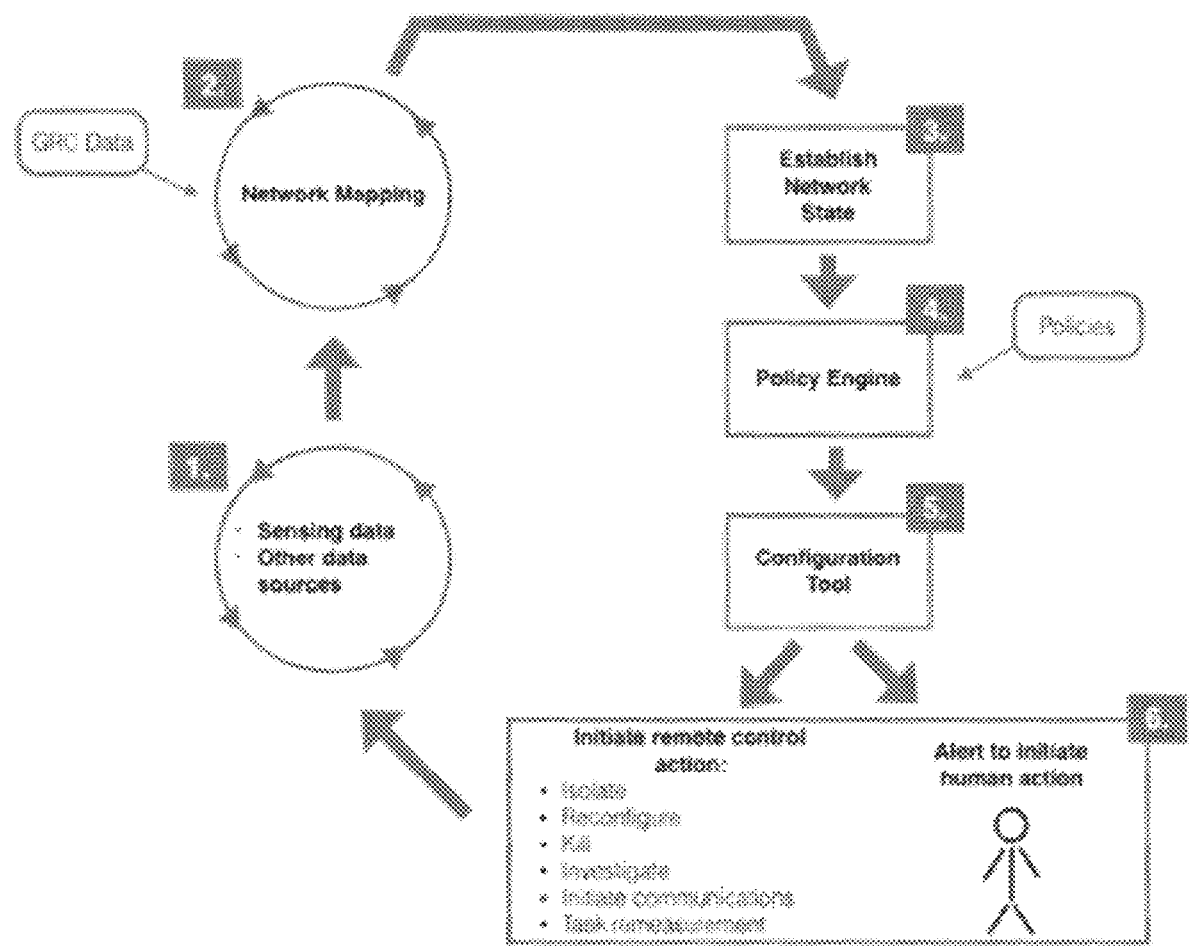
FIG. 7 includes a generalized illustration of a closed embodiment of an Internet monitoring platform.

FIG. 7 includes a generalized illustration of a closed embodiment of an Internet monitoring platform. Initially, the Internet monitoring platform can acquire data regarding a private network associated with a client from at least one source on a continuous basis. In some embodiments the data may be pulled from each source by the Internet monitoring platform, while in other embodiments the data may be pushed to the Internet monitoring platform by each source. Examples of data include client data (e.g., private network data), third-party data, and sensing data generated by an Internet sensing platform as described in U.S. application Ser. No. 15/984,030, which is incorporated by reference herein in its entirety. Sensing data may include information on devices, services, ports, certificates, DNS records, etc., that are associated with the client and are observed by the Internet sensing platform on the global Internet. The Internet sensing platform may be communicatively coupled to the Internet monitoring platform. For example, the Internet sensing platform and the Internet monitoring platform may reside on a network-accessible server system comprised of one or more computer servers.

Thereafter, the Internet monitoring platform can map the boundaries of the private network on a continual basis. For example, the Internet monitoring platform may map all assets associated with, or relevant to, the private network to establish a boundary. The boundary may include those public-facing assets corresponding to the core network and subsidiaries, as well as vendors, supply chain networks, customer-of-customer networks, shared hosts, cloud environments, pseudo-networks, etc. A pseudo-network can include assets designed to appear as though they are relevant to the client. Examples of such assets include fraudulent certificates, falsified domains, etc. While the assets forming the pseudo-network may not actually be associated with the client, they may be considered relevant to the client since these assets represent a threat to the private network.

For example, based on the traffic flows of the private network, the Internet monitoring platform may be able to determine whether a client is communicating with a given Software-as-a-Service (SaaS) provider (or using a given piece of software, such as an anti-virus computer program) by seeing whether any outgoing communications have been directed toward the computer server(s) responsible for providing updates. Similarly, the Internet monitoring platform may catalogue all IP addresses, domains, certificates, devices, services, etc., that are accessible via the Internet and relevant to the client. For example, the Internet monitoring platform may identify all IP addresses registered to a subsidiary company of the client, all domains registered to a parent company of the client, all client-attributable services observed in cloud environments (e.g., domains, websites, webservers, certificates, Remote Desktop Protocol (RDP) and Virtual Network computing (VNC) sessions), etc. If the offerings of a vendor of cloud-based hosting services are publicly available, the Internet monitoring platform may simply acquire client data from the cloud environment(s) associated with the client.

The Internet monitoring platform can then establish a status of the private network. The status may be indicative of the risk of an unauthorized access of the private network. In some embodiments, the status is updated in real time as the private network experiences changes. Examples of changes include the introduction of new assets that form the network boundary, the removal of deprecated assets that no longer form the network boundary, and any changes to those assets that form the network boundary. Another example of a change is the association of a business relationship category (e.g., core network, subsidiary network, shared hosting, pseudo-network) with an asset. The Internet monitoring platform may also acquire business information, either in an automated manner or manual manner, about the state of the private network. The business information may concern non-public acquisitions or divestitures, new vendor relationships or switches, new customer-of-customer arrangements, or planned changes to subnets or boundary allocations.

In some embodiments, the Internet monitoring platform executes a policy engine (also referred to as a "policy module") configured to apply appropriate policies based on the boundary of the private network. For example, the Internet monitoring platform may apply one or more policies to initiate control actions, as further described above with respect to FIG. 5. Policies may be predetermined, and policies may be defined by either the client or the Internet monitoring platform. Policies may govern, for example, integration efforts, permitted device classes, permitted certificate parameters, permitted compliance frameworks (e.g., Health insurance Portability and Accountability Act of 1996 (HIPAA) or National Institute of Standards and Technology (NIST)), or advanced queries involving public-facing assets (e.g., by identifying any IP addresses that ran a web service in the last three months and now run a database service). Policies may be derived from a rule-based framework according to the state of the private network.

In some instances, the application of a policy will prompt the Internet monitoring platform to deploy a configuration tool designed to remotely initiate an appropriate control action. Examples of control actions include:
- Isolation: The configuration tool may isolate an asset from the rest of the private network by controlling of a tool, isolating a subset, etc.
- Reconfiguration: The configuration tool may reconfigure a network orchestration parameter or a network tool, reboot an asset (e.g., a virtual machine), force deployment of a software update/patch, etc. For instance, the configuration tool may change the settings of a vulnerability scanner or firewall to account for changes in the boundary of the private network.
- Kill: The configuration tool may remotely turn off a given asset, such as a service (e.g., File Transfer Protocol (FTP) or Microsoft SQL (MSSQL)), a development environment, a cluster or a container, a virtual machine, or a network gateway.
- Investigate: The configuration tool may investigate the private network by examining log data, network performance data, etc. In some instances, the configuration tool may initiate an investigation ticket via a security information and event management (SIEM) system or some other analysis tool.

Initiate Communications: The configuration tool may alert an individual (e.g., a special administrator) associated with the client through any conceivable communication tool. Additionally or alternatively, the configuration tool may initiate communication with a third party, such as a vendor, supply chain, subsidiary, affiliate, ISP, MSSP, peer, competitor, industry group, government organization, or another independent entity.

Task Remeasurement: The Internet monitoring platform may verify whether the configuration tool actually worked. If the configuration tool did not work as intended, the Internet monitoring platform may initiate the desired task a second time and/or notify an individual (e.g., a special administrator) associated with the client who can perform the task manually.

Open Ports

In some embodiments, an Internet monitoring platform cis configured to discover the open ports that are publicly accessible on a network (e.g., a private network associated with a client). FIG. 8 includes a flow diagram of a process 800 for discovering the open ports on a computer network. Initially, the Internet monitoring platform can scan for open ports on the edge(s) of a network (step 801). Said another way, the Internet monitoring platform can discover the boundary of the network based on which ports are publicly accessible. Scanning may be performed on a continual basis or a periodic basis (e.g., weekly, daily, or hourly). To scan an open port, the Internet monitoring platform may send data packet(s) in an effort to provoke a response. If the Internet monitoring platform receives a response after sending data packet(s) toward a port, the Internet monitoring platform can establish that the port is open (e.g., accessible via the Internet).

The Internet monitoring platform can collect responses received from these open ports, including any partial responses (step 802), and then establish a statistical baseline for open port behavior for the network based on the responses (step 803). As noted above, the Internet monitoring platform may periodically perform steps 801-802 over time. With each new scan of the edge(s) of the network, the Internet monitoring platform can determine whether the response(s) deviate from the established statistical baseline by at least a predetermined amount (step 804). Additionally or alternatively, the Internet monitoring platform may determine whether the response(s) deviate from a best practice policy defined by the client or the Internet monitoring platform. If the Internet monitoring platform discovers that the response(s) deviate from the statistical baseline by at least the predetermined amount, then the Internet monitoring platform can generate an alert (step 805). The alert may be transmitted to a special administrator who is responsible for managing the network.

Alerts

An alert may be generated responsive to discovering that an open port accessible along the boundary of a private network associated with a client has experienced a behavior change. A behavior change may be defined by a deviation from an established network baseline or a deviation from a best practice policy/configuration defined by the client or the Internet monitoring platform. Examples of behavior changes include:

The opening of a port on an IP address that has not historically been open;

The closing of a port on an IP address that has not historically been closed;

The confluence of at least two ports on an IP address that are unexpected or deviate from a defined best practice policy;

Any partial response or change to a response on any port(s) on an IP address;

Any unexpected response on any port(s) on an IP address; and

Any change to the relative statistical baselines of at least two edges of a network.

Use Cases

Several use cases are provided below for the purpose of illustration.

A. Misconfigured Devices

If a device either has more than one port open or the wrong port open, then the device may have been misconfigured (or remains in an unsafe default configuration). Qadium, Inc. has observed this happen with a client, where a device with an unencrypted login was misconfigured and open on port 443 (i.e., for encrypted HyperText Transfer Protocol (HTTP)) and port 8000. The client was unaware that port 8000 was open, and thus did not detect the unencrypted login. By employing the technology described herein, an Internet monitoring platform could have discovered the vulnerability prior to the unencrypted login.

B. Deviation from Web Policy

A device intended to be connected to a public network (e.g., the Internet) may occasionally have too many alternative ports that are left open. Each of these open ports represents a potential vulnerability, and therefore should be dealt with. A client may, for example, maintain a best practice policy where unencrypted web servers can only operate over port 80 and encrypted web servers can only operate over port 443. Under such a policy, an Internet monitoring platform could be programmed to generate an alert upon discovering a web service open on any additional ports, including ports 80, 443, 8080, 8443, etc.

C. Outlawed Ports

In some cases, a client may have a policy against running services on some ports. For example, a client may never intend for the port corresponding to Telnet (e.g., port 23) or the port corresponding to unencrypted FTP (e.g., port 21) to be publicly accessible (e.g., running on the Internet). By monitoring these ports/services, an Internet monitoring platform can determine whether any ports/services have violated the terms of the policy.

D. Unopen Ports

As further described above with respect to FIG. 8, an Internet monitoring platform may establish a statistical baseline for a network based on the responses received from the open port(s) on the network. From these responses, the Internet monitoring platform can establish which port(s) are not typically open along an edge of the network. If the Internet monitoring platform discovers that a port has unexpectedly opened, it can take appropriate remediation action(s).

Similarly, the Internet monitoring platform may monitor whether batches of ports have been unexpectedly opened or closed. For instance, the Internet monitoring platform may compare the set of currently open ports to those normally open according to the statistical baseline for the network or a best practice policy defined by the client or the Internet monitoring platform. Such a comparison may highlight instances of employee malfeasance, data exfiltration, or misconfigured services.

E. IP Addresses Abruptly Changing Services or Protocols

Some IP addresses may be allocated (e.g., by the client) for a specific function. If the use of one of these IP addresses abruptly changes (e.g., the IP address begins to be used for a different function), the Internet monitoring platform can generate an alert. One example of such a situation is where a client allocates a range of IP addresses for special (e.g., lax) firewall rules, like a staging environment, and then the service hosted on these IP addresses abruptly changes (e.g., from Secure Socket Shell (SSH) to DNS), which may indicate a tunneling scenario or an exfiltration scenario.

F. Changes in Response Behavior of Different Port-IP Address Pairs

In some embodiments, the Internet monitoring platform is configured to monitor the response behavior of open ports accessible along the edge of a network to determine if the responses, whether partial or full, deviate from the statistical baseline for the network. Additionally or alternatively, the Internet monitoring platform may determine whether the responses deviate from a policy defined by the client or the Internet monitoring platform. Behavioral changes may be indicative of a misconfiguration that could leak information useful to an unauthorized entity, such as a hacker.

G. Unexpected Response Behavior of Different Port-IP Address Pairs

The Internet monitoring platform may also examine responses received from the open ports accessible along the edge of a network to determine whether any unexpected services are running on unusual ports. For example, if the Internet monitoring platform has established that Services A, B, and C normally run on Ports A, B, and C, respectively, then the Internet monitoring platform may generate an alert if it discovers a change has occurred (e.g., Service A is now running on Port B or Port C). Such changes may be indicative of a misconfiguration or a violation of a best practice policy.

H. Unauthorized Ports in a Country of Interest

In some instances, clients choose to restrict access to ports based on geographical region. For example, a client may not allow encrypted web traffic in any regional office located in China. In such a situation, the Internet monitoring platform may notify the client each time an IP address geolocated in China becomes open on a port intended for encrypted web traffic.

Processing System

Figure 9:
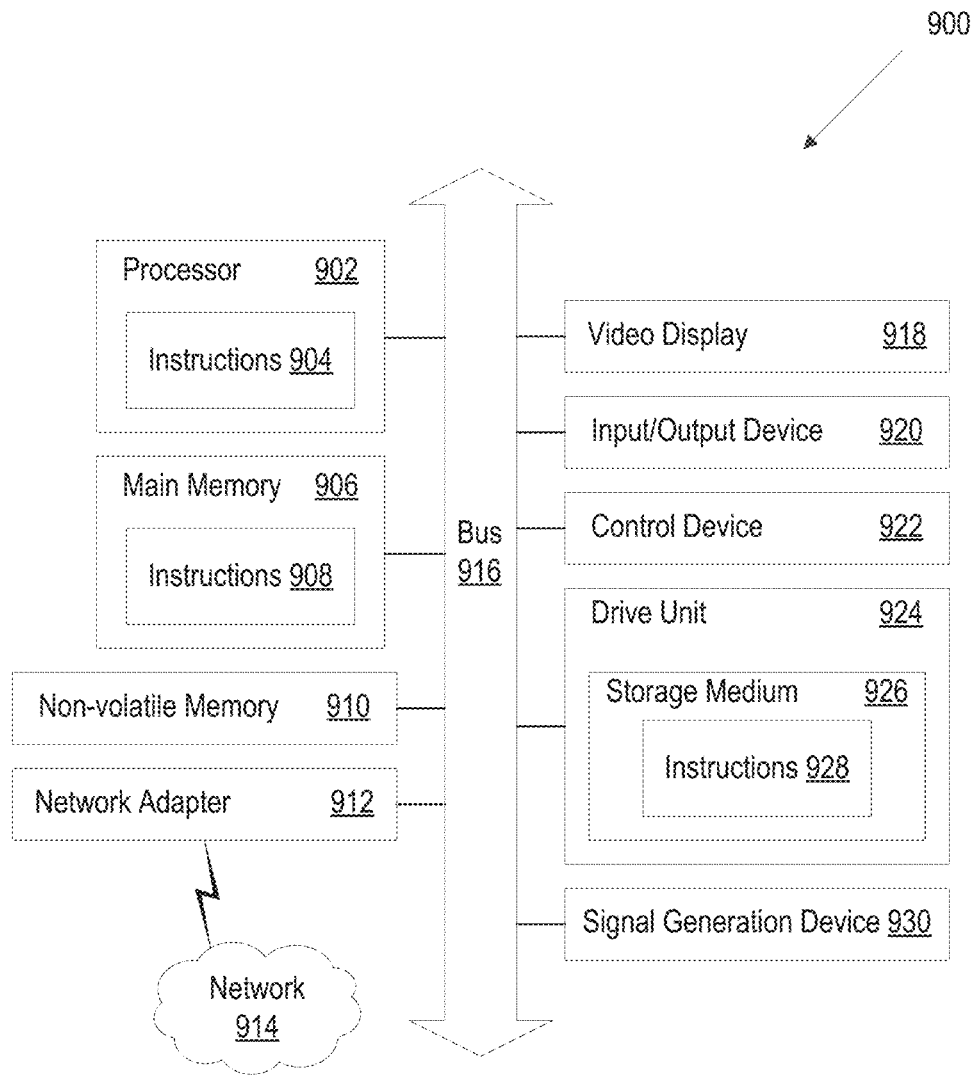
FIG. 9 is a block diagram illustrating an example of a processing system in which at least some operations described herein can be implemented.

FIG. 9 is a block diagram illustrating an example of a processing system 900 in which at least some operations described herein can be implemented. For example, some components of the processing system 900 may be hosted on a computing device that includes an Internet monitoring platform.

The processing system 900 may include one or more central processing units ("processors") 902, main memory 906, non-volatile memory 910, network adapter 912 (e.g., network interface), video display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents one or more physical buses and/or point-to-point connections that are connected by appropriate bridges, adapters, or controllers. The bus 916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 900 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 900.

While the main memory 906, non-volatile memory 910, and storage medium 926 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 928. The term "machine-readable medium" and "storage medium" shall also be taken to include any medium that is capable of storing, encoding, or carrying a set of instructions for execution by the processing system 900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in a computing device. When read and executed by the one or more processors 902, the instruction(s) cause the processing system 900 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 910, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 912 enables the processing system 900 to mediate data in a network 914 with an entity that is external to the processing system 900 through any communication protocol supported by the processing system 900 and the external entity. The network adapter 912 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 912 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated, in general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method, comprising:
   discovering events that alter a boundary of a private network associated with an organization by:
   establishing a boundary of a private network associated with an organization by identifying each public Internet Protocol (IP) address that is presently capable of allowing a device belonging to the organization to connect to the Internet;
   monitoring the established boundary of the private network;
   determining that an event occurred that altered the established boundary of the private network; and
   autonomously addressing a heightened security risk resulting from the event on behalf of the organization;
   wherein said autonomously addressing comprises performing an appropriate remediation action to address the heightened security risk resulting from the event;
   wherein the event includes addition of a new public IP address that is capable of connecting to the Internet; and
   wherein the appropriate remediation action includes reconfiguring a network tool to examine data packets originating from the new public IP address, data packets destined for the new public IP address, or any combination thereof.

2. The computer-implemented method of claim 1, wherein said establishing the private network boundary comprises:
   receiving, from the organization, input specifying one or more public IP addresses that define the boundary of the private network.

3. The computer-implemented method of claim 1, wherein said establishing the private network boundary comprises:
   monitoring traffic traversing the Internet;
   filtering the traffic to identify a first batch of data packets originating from the private network, a second batch of data packets destined for the private network, or any combination thereof; and
   parsing the first batch of data packets, the second batch of data packets, or any combination thereof to identify one or more public IP addresses that define the boundary of the private network.

4. The computer-implemented method of claim 1, wherein said monitoring is performed on a periodic basis.

5. The computer-implemented method of claim 1, wherein the event includes the addition of a new public IP address that connects to the Internet.

6. The computer-implemented method of claim 1, wherein the event includes removal of an existing public IP address that was connected to the Internet.

7. The computer-implemented method of claim 1, wherein the event includes a modification to a communication policy that governs how an existing public IP address communicates over the Internet.

8. The computer-implemented method of claim 1, further comprising:
   identifying a technological category corresponding to the event; and
   identifying a business relationship category corresponding to the event;
   wherein the appropriate remediation action is based on the technological category, the business relationship category, or any combination thereof.

9. The computer-implemented method of claim 1, wherein said autonomously addressing comprises:
   generating a notification that specifies a characteristic of the event; and
   transmitting the notification to an administrator associated with the organization.

10. A non-transitory computer-readable medium with instructed stored thereon that, when executed by a processor, cause the processor to perform operations comprising:
    establishing a boundary of a private network associated with an organization by identifying each public Internet Protocol (IP) address that is presently capable of allowing a device belonging to the organization to connect to the Internet;

scanning each device for each open port that is publicly accessible along the boundary of a network, wherein said scanning comprises:

transmitting a query designed to elicit a response to each known port on the network;

collecting responses, if any, returned in response to the queries; and examining the responses to identify the open ports that are publicly accessible along the boundary of the network;

establishing, based on said scanning, a statistical baseline for open port activity of the network;

performing a targeted scan of at least one open port accessible along the boundary of the network;

comparing a result of the targeted scan to the statistical baseline;

determining that the result of the targeted scan deviates from the statistical baseline by at least a predetermined amount; and generating an alert that specifies the network has experienced a change in the open port activity;

wherein the change in the open port activity of the network is indicative of a heightened security risk.

11. The non-transitory computer-readable medium of claim 10, wherein the network is a private network associated with an organization.

12. The non-transitory computer-readable medium of claim 10, wherein said scanning is performed on a periodic basis.

13. The non-transitory computer-readable medium of claim 10, wherein the operations further comprise:

transmitting the alert to an administrator associated with the organization.

14. An electronic device comprising:

a memory that includes instructions for discovering events that alter a boundary of a first network, wherein the instructions, when executed by a processor, cause the processor to:

establish the boundary of the first network by identifying each Internet Protocol (IP) address on the first network that is presently connected to a second network;

monitor the boundary of the first network;

determine that an event occurred that altered the boundary of the first network;

autonomously address a heightened security risk resulting from the event;

examine traffic corresponding to one or more IP addresses that define the boundary of the first network, wherein the traffic includes data packets originating from the one or more IP addresses, data packets destined for the one or more IP addresses, or any combination thereof;

establish, based on the examination of the traffic, a statistical baseline for the first network indicative of internetwork activity.

15. The electronic device of claim 14, wherein the first network is a private network associated with an organization, and wherein the second network is the Internet.

16. An electronic device comprising:

a memory that includes instructions for discovering events that alter a boundary of a first network, wherein the instructions, when executed by a processor, cause the processor to:

establish the boundary of the first network by identifying each Internet Protocol (IP) address on the first network that is presently connected to a second network;

monitor the boundary of the first network;

determine that an event occurred that altered the boundary of he first network;

autonomously address a heightened security risk resulting from the event;

compare traffic corresponding to the one or more IP addresses that define the boundary of the first network to a statistical baseline on a periodic basis; and in response to discovering that the traffic deviates from the statistical baseline by at least a predetermined amount, generate an alert that specifies the first network has experienced a change in internetwork activity.

17. An electronic device comprising:

a memory that includes instructions for discovering events that alter a boundary of a first network, wherein the instructions, when executed by a processor, cause the processor to:

establish the boundary of the first network by identifying each Internet Protocol (IP) address on the first network that is presently connected to a second network;

monitor the boundary of the first network;

determine that an event occurred that altered the boundary of the first network;

autonomously address a heightened security risk resulting from the event;

discover that a particular IP address has experienced a behavior change; and generate an alert that specifies the first network is experiencing a heightened security risk due to the behavior change;

wherein the behavior change includes:

the opening of a port on the particular IP address that has not historically been open, the closing of a port on the particular IP address that has not historically been closed, the deviation of at least two ports on the particular IP address from a predefined policy, the receipt of a partial response from a port on the particular IP address, the receipt of an unexpected response from a port on the particular IP address, or any combination thereof.

* * * * *

UNITED STATES PATENT AND TRADEMARK OFFICE
CERTIFICATE OF CORRECTION

PATENT NO. : 11,102,174 B2
APPLICATION NO. : 16/230589
DATED : August 24, 2021
INVENTOR(S) : Lisa Catherine Wallace, Matthew Kraning and Gregory Toto Page 1 of 1

It is certified that error appears in the above-identified patent and that said Letters Patent is hereby corrected as shown below:

In the Claims

Column 20, Line 15, the portion reading -of he first- should read --of the first--

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*